(12) United States Patent
Gatzhammer et al.

(10) Patent No.: US 11,122,426 B2
(45) Date of Patent: Sep. 14, 2021

(54) METHOD FOR THE ASSIGNMENT OF INDUSTRIAL FIELD DEVICES IN A CLOUD ENVIRONMENT

(71) Applicant: Siemens Aktiengesellschaft, Munich (DE)

(72) Inventors: Bernhard Gatzhammer, Munich (DE); Ludwig Andreas Mittermeier, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 64 days.

(21) Appl. No.: 16/500,115

(22) PCT Filed: Mar. 14, 2018

(86) PCT No.: PCT/EP2018/056420
§ 371 (c)(1),
(2) Date: Oct. 2, 2019

(87) PCT Pub. No.: WO2018/184805
PCT Pub. Date: Oct. 11, 2018

(65) Prior Publication Data
US 2021/0099865 A1   Apr. 1, 2021

(30) Foreign Application Priority Data
Apr. 6, 2017 (DE) .................. 10 2017 205 887.0

(51) Int. Cl.
*H04L 29/06* (2006.01)
*H04W 12/04* (2021.01)
(Continued)

(52) U.S. Cl.
CPC ........... *H04W 12/04* (2013.01); *H04W 12/42* (2021.01); *H04W 12/47* (2021.01)

(58) Field of Classification Search
CPC ..... H04W 12/04; H04W 12/47; H04W 12/42; H04L 63/08; H04L 63/0869; H04L 63/0876; G06F 21/72; G06F 21/73
See application file for complete search history.

(56) References Cited

U.S. PATENT DOCUMENTS 8,627,438 B1 * 1/2014 Bhimanaik ............. G06F 21/36
                                                       726/9
9,172,605 B2 * 10/2015 Hardy .................... H04L 67/10
(Continued)

FOREIGN PATENT DOCUMENTS

| DE | 102014108162 A1 | 12/2015 |
| WO | 2015100109 A1 | 7/2015 |
| WO | WO 2015100109 A1 | 7/2015 |

OTHER PUBLICATIONS

PCT International Search Report dated Jun. 11, 2018 corresponding to PCT International Application No. PCT/EP2018/056420.

*Primary Examiner* — Hosuk Song
(74) *Attorney, Agent, or Firm* — Schmeiser, Olsen & Watts LLP

(57) ABSTRACT

Provided is a method for the assignment of industrial field devices to a user account in a cloud environment, including logging in of a user; scanning of the public identifier; checking, of whether the field device is already linked to a user account; connecting of the field device to the Internet by the user, provided such a connection does not yet exist, in such a way that the cloud environment can be contacted by the field device; triggering a linking of the field device by the user by means of the mobile terminal of the user and the previously scanned public identifier of the field device; authenticating of the field device in the cloud environment by means of the private security key of the field device and assigning of the field device to the public identifier by means of the cloud environment.

7 Claims, 1 Drawing Sheet

(51) Int. Cl.
*H04W 12/47* (2021.01)
*H04W 12/42* (2021.01)

(56) References Cited

U.S. PATENT DOCUMENTS

| | | | |
|---|---|---|---|
| 9,292,605 B2* | 3/2016 | Zhou | H04L 63/0428 |
| 9,882,774 B2* | 1/2018 | Schallich | H04L 12/2898 |
| 9,979,720 B2* | 5/2018 | Bhimanaik | H04L 9/321 |
| 10,255,479 B2* | 4/2019 | Tsur | G06Q 20/40145 |
| 10,484,345 B2* | 11/2019 | Shastry | H04L 63/068 |
| 2015/0121486 A1 | 4/2015 | Ye | |
| 2015/0207796 A1* | 7/2015 | Love | H04W 12/06 |
| | | | 600/345 |

* cited by examiner

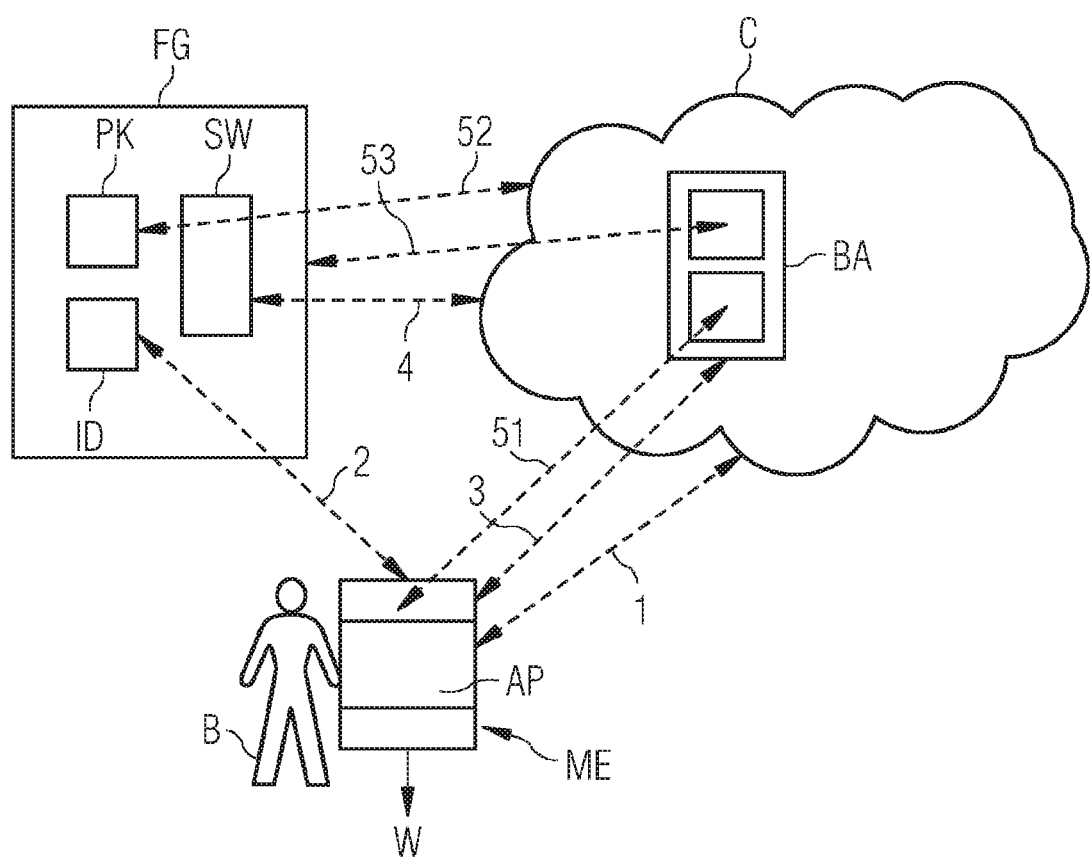

METHOD FOR THE ASSIGNMENT OF INDUSTRIAL FIELD DEVICES IN A CLOUD ENVIRONMENT

CROSS-REFERENCE TO RELATED APPLICATIONS

This application claims priority to PCT Application No. PCT/EP2018/056420, having a filing date of Mar. 14, 2018, which is based on German Application No. 10 2017 205 887.0, having a filing date of Apr. 6, 2017, the entire contents both of which are hereby incorporated by reference.

FIELD OF TECHNOLOGY

The following relates to a method for the assignment of industrial field devices to a user account in a cloud environment and to an associated field device, and to a corresponding application program for a mobile terminal.

BACKGROUND

Essentially three methods are known at present in this respect:

In the first case, the field device is already equipped with a unique user-specific security key in the production process. The assignment is thus already contained upon delivery and is thus highly inflexible.

In the second case, the user generates a unique user-specific security key, which he transmits to the field device for example using a USB stick, in the cloud environment. The assignment is thus likewise relatively inflexible and takes place as it were by wav of a cumbersome manual transmission of the security key to the field device.

In the last case, the field device is equipped with a unique user-non-specific security key in the production process, which allows more flexibility than the other two methods. A user in the immediate physical vicinity is able to share this user-non-specific security key either graphically, for example via a display, or using a wireless connection, for example a WLAN generated by the field device, and thus generate the assignment, but this however constitutes a certain lack of security. The main disadvantage of this method is however that industrial field devices at present often do not have a display, WLAN or other wireless communication method available to them, and the method is often not suitable for industrial field devices.

SUMMARY

An aspect relates to a method for the assignment of industrial field devices in a cloud environment in which the abovementioned disadvantages are as far as possible avoided or in which a flexible, inexpensive and secure assignment of a technical field device is made possible in the simplest possible way.

The embodiments essentially relates to a method for the assignment of industrial field devices to a user account in a cloud environment, having the following steps: registering a user in the cloud environment; the user scanning the public identifier using his mobile terminal; checking, by way of his mobile terminal by establishing contact with the cloud environment, whether the field device is already linked to a user account; the user connecting the field device to the Internet provided that no such connection exists, such that the cloud environment is able to be contacted by the field device; the user triggering linking of the field device using his mobile terminal and the previously scanned public identifier of the field device; authenticating the field device in the cloud environment using its private security key and assigning the field device to the public identifier by way of the cloud environment. The embodiments furthermore relates to an associated field device and to a corresponding application program for a mobile terminal. The embodiments advantageously allows inter alia a flexible reassignment of a field device FG to other users B, and the possibility of regenerating the public identifier ID and the assignment to the private security key PK.

BRIEF DESCRIPTION

Some of the embodiments will be described in detail, with references to the following FIGURES, wherein like designations denote like members, wherein:

The drawing illustrates a field device FG having a unique user-non-specific private security key PK, having a public identifier ID and having software SW, a user B having a mobile terminal ME and a cloud environment C containing a user account BA. The drawing also illustrates the essential steps 1, 2 . . . , 51, 52 and 53 of the method according to embodiments of the invention in the form of dashed double-headed arrows.

DETAILED DESCRIPTION

According to embodiments of the invention, the assignment of the field device FG to the user account BA takes place in the cloud environment C using the mobile terminal ME as follows:

In a first step 1, the user B registers in the cloud environment C.

In a second step 2, the user B scans the public identifier ID using his mobile terminal ME. This may be performed for example using NFC (near-field communication), by capturing a QR code using a camera or via Bluetooth.

In a third step 3, the mobile terminal ME checks, by establishing contact with the cloud environment C, whether the field device FG is already linked to a user account BA, and outputs a corresponding warning W if this is the case.

In a fourth step 4, the user B connects the field device FG to the Internet, such that it is able to establish contact with the cloud environment C.

In a fifth step 51, the user B initiates linking of the field device FG using his mobile terminal ME and the previously scanned public identifier ID of the field device FG.

In a penultimate step 52, the field device FG uses its private security key for authentication in the cloud environment, which then concludes the linking in a last step 53 by way of the assignment to the public identifier ID.

To this end, the field device FG is already equipped both with a unique user-non-specific private security key PK and with a public identifier ID in the production process, wherein the public identifier ID is able to be read only in the physical vicinity. In the immediate vicinity of a field device, a simple assignment of a user B to this field device FG is thereby possible using a mobile terminal by way of wireless mechanisms, wherein the field device for this purpose does not itself require any additional technical mechanisms, such as a display, WLAN, etc.

In the method according to embodiments of the invention, the security is increased by the additional private security key PK. The private security key PK may in this case be read simply only by the software SW on the technical field device FG, which software establishes the connection to the cloud environment C, wherein the cloud environment C contains a corresponding authorized user/tenant account.

The unique user-non-specific public identifier ID may by contrast be read simply by the user B using a mobile terminal ME, wherein the user B for this purpose has to be situated in the immediate vicinity of the field device FG.

The identifier ID may be made available for example in the form of QR code/NFC stickers.

The pairing of the private security key PK with the public identifier ID is known to the cloud environment C.

Although the present invention has been disclosed in the form of preferred embodiments and variations thereon, it will be understood that numerous additional modifications and variations could be made thereto without departing from the scone of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for an assignment of industrial field devices to a user account in a cloud environment, the method comprising:
   registering a user in the cloud environment;
   the user scanning, using a mobile terminal, a public identifier generated in a production process such that the public identifier is able to be read only in a physical vicinity;
   checking, by way of the mobile terminal by establishing contact with the cloud environment, whether a field device is already linked to a user account;
   the user connecting the field device to the Internet provided that no such connection exists, such that the cloud environment is able to be contacted by the field device;
   the user triggering linking of the field device using the mobile terminal and the previously scanned public identifier of the field device;
   authenticating the field device in the cloud environment using a unique user-non-specific private security key generated in the production process such that the unique user non-specific private security key is able to be used for authentication in the cloud environment; and
   assigning the field device to the public identifier by way of the cloud environment.

2. The method as claimed in claim 1, wherein the public identifier is scanned by capturing a QR code using a camera.

3. The method as claimed in claim 1, wherein the public identifier is scanned via Bluetooth.

4. The method as claimed in claim 1, wherein, if the check reveals that the field device is already linked to the user account, a corresponding warning is output by the mobile terminal.

5. A field device, comprising:
   a unique user-non-specific private security key already generated in a production process such that the unique user non-specific private security key is able to be used for authentication in a cloud environment, and
   a public identifier already generated in the production process such that the public identifier is able to be read only in a physical vicinity of the field device;
   wherein the public identifier is configured to be scanned by a user using a mobile terminal;
   wherein the unique user-non-specific private security key is configured for authenticating the field device in the cloud environment; and
   wherein the field device is configured to be assigned to the public identifier by the cloud environment.

6. The field device as claimed in claim 5, wherein the public identifier is a sticker.

7. An application program for a mobile terminal, comprising:
   a program segment for registering a user in a cloud environment,
   a program segment for scanning a public identifier of a field device using NFC, by recording a QR code using a camera or via Bluetooth, wherein the public identifier is generated in a production process such that the public identifier is able to be read only in a physical vicinity,
   a program segment for checking, by establishing contact with the cloud environment, whether the field device is already linked to a user account, and for outputting a corresponding warning, and
   a program segment for triggering linking of the field device and the previously scanned public identifier,
   wherein linking includes authenticating the field device in the cloud environment using a unique user-non-specific private security key generated in the production process such that the unique user non-specific private security key is able to be used for authentication in the cloud environment and assigning the field device to the public identifier by way of the cloud environment.

* * * * *